United States Patent [19]
Iwakiri et al.

[11] Patent Number: 5,569,700
[45] Date of Patent: Oct. 29, 1996

[54] THERMOPLASTIC RESIN COMPOSITION FOR PROFILE EXTRUSION

[75] Inventors: Tsuneaki Iwakiri; Gorou Shimaoka, both of Kanagawa, Japan

[73] Assignee: Mitsubishi Gas Chemical Company, Inc., Tokyo, Japan

[21] Appl. No.: 415,320

[22] Filed: Apr. 3, 1995

[30]   Foreign Application Priority Data

Apr. 4, 1994  [JP]  Japan ................. 6-066058

[51] Int. Cl.$^6$ ................. C08L 69/00; C08K 7/14
[52] U.S. Cl. ................. 524/504; 524/508; 525/67
[58] Field of Search ................. 524/504, 508; 525/67

[56]    References Cited

U.S. PATENT DOCUMENTS 4,656,225  4/1987  Boutni et al. ................. 525/67

FOREIGN PATENT DOCUMENTS

| | | | |
|---|---|---|---|
| 131188 | 1/1985 | European Pat. Off. | ............ 525/67 |
| 0163411 | 12/1985 | European Pat. Off. | .. |
| 0388231 | 9/1990 | European Pat. Off. | .. |
| 215448 | 12/1983 | Japan . | |

*Primary Examiner*—David Buttner
*Attorney, Agent, or Firm*—Sughrue, Mion, Zinn, Macpeak & Seas

[57]                ABSTRACT

A resin composition comprising (a) a thermoplastic aromatic polycarbonate resin, (b) a graft co-polymer obtained by copolymerizing ethylene-α-olefin-diene copolymer and a monomer mixture comprising as main components an aromatic vinyl compound and vinyl cyanide compound as a main component, (c) a glass filler and (d) carbon fiber. The resin composition of the present invention has excellent rigidity, strength, heat resistance, high-impact properties, weathering resistance, appearance and drawdown property, and is swelling resistant.

11 Claims, 1 Drawing Sheet

THERMOPLASTIC RESIN COMPOSITION FOR PROFILE EXTRUSION

BACKGROUND OF THE INVENTION

1. Field of the Invention

The present invention is directed to a resin composition comprising (a) a thermoplastic aromatic polycarbonate resin, (b) a graft co-polymer obtained by copolymerizing ethylene-α-olefin-diene copolymer and a monomer mixture comprising an aromatic vinyl compound and a vinyl cyanide compound as a main component, (c) a glass filler and (d) carbon fiber. More particularly, the resin composition of the present invention has excellent rigidity, strength, heat resistance, high-impact properties, weathering resistance, appearance and drawdown property, and is swelling resistant.

2. Description of the Related Art

Until now, metal materials, such as aluminum and iron, have been used for fabricating building materials, such as a window panel and a door sash. At present, for a variety of applications, a synthetic resin is also employed. The advantage of a window panel or door sash made of a synthetic resin is primarily a heat insulation function. Other advantages include prevention of moisture condensation and ease of design. Until now, PVC resin has mainly been used as a synthetic resin for these building applications. However, PVC resin is too heavy and also inadequate to heat insulation properties, strength, rigidity and impact resistance, and improvements in these properties are desired.

The performance required of a building material for a window panel and door sash is a specific gravity of 1.40 or less, a flexural modulus of 50,000 kJ/cm$^2$ or more and a Charpy impact strength of 20 kg/cm$^2$ or more. Furthermore dimensional accuracy, heat resistance, weathering resistance and also a new material feeling are desired.

An aromatic polycarbonate resin has satisfactory heat resistance and impact resistance, among the above-described properties required of a thermoplastic resin composition for fabricating a window panel and door sash.

Aromatic polycarbonate resin has excellent heat resistance and impact resistance as compared to PVC resin, However, aromatic polycarbonate resin does not exhibit an adequate drawdown property or shaping property at the time of a profile extrusion. This is because the aromatic polycarbonate resin generally has a low melt strength.

Known aromatic polycarbonate resins having a relatively high melt strength include a high viscosity aromatic polycarbonate resin and a branched aromatic polycarbonate resin.

However, these polycarbonate resins used alone are unsuitable for application to profile extrusion having a complex shape in accordance with the present invention, in terms of flowability (throughput rate) and profile extrusion property.

Furthermore, to design a material having a flexural modulus of 50,000 kg/cm$^2$ or more, an inorganic filler, such as a glass filler, e.g., glass fiber, glass flake, glass bead, etc.; a carbon filler, e.g., carbon black and carbon fiber, etc., and other inorganic fillers are added to the resin in a relatively large amount. However, the addition of these fillers increases the specific gravity, such that the resulting product is too heavy.

The present invention solves the above-described problems of conventional products made of PVC resin, and provides a thermoplastic resin composition suitable for producing a profile extrusion molding product, such as a building material, e.g., a window panel and a door sash, having excellent appearance, rigidity, impact resistance and a new material feeling.

SUMMARY OF THE INVENTION

The present inventors have conducted extensive investigations to develop a thermoplastic resin composition that is well adapted for profile extrusion of complex shapes and having excellent rigidity, strength, heat resistance, impact resistance, resistance to weathering, appearance, drawdown property and swelling properties. As a result, the present inventors have discovered that the above objectives are achieved by providing a resin composition comprising (a) from 10 to 90% by weight of a thermoplastic aromatic polycarbonate resin, (b) from 5 to 60% by weight of a graft co-polymer obtained by copolymerizing ethylene-α-olefin-diene copolymer and a monomer mixture comprising as main components an aromatic vinyl compound and a vinyl cyanide compound, (c) from 5 to 30% by weight of a glass filler, and (d) from 0.5 to 30% by weight of carbon fiber.

DESCRIPTION OF THE PREFERRED EMBODIMENTS

Figure 1:
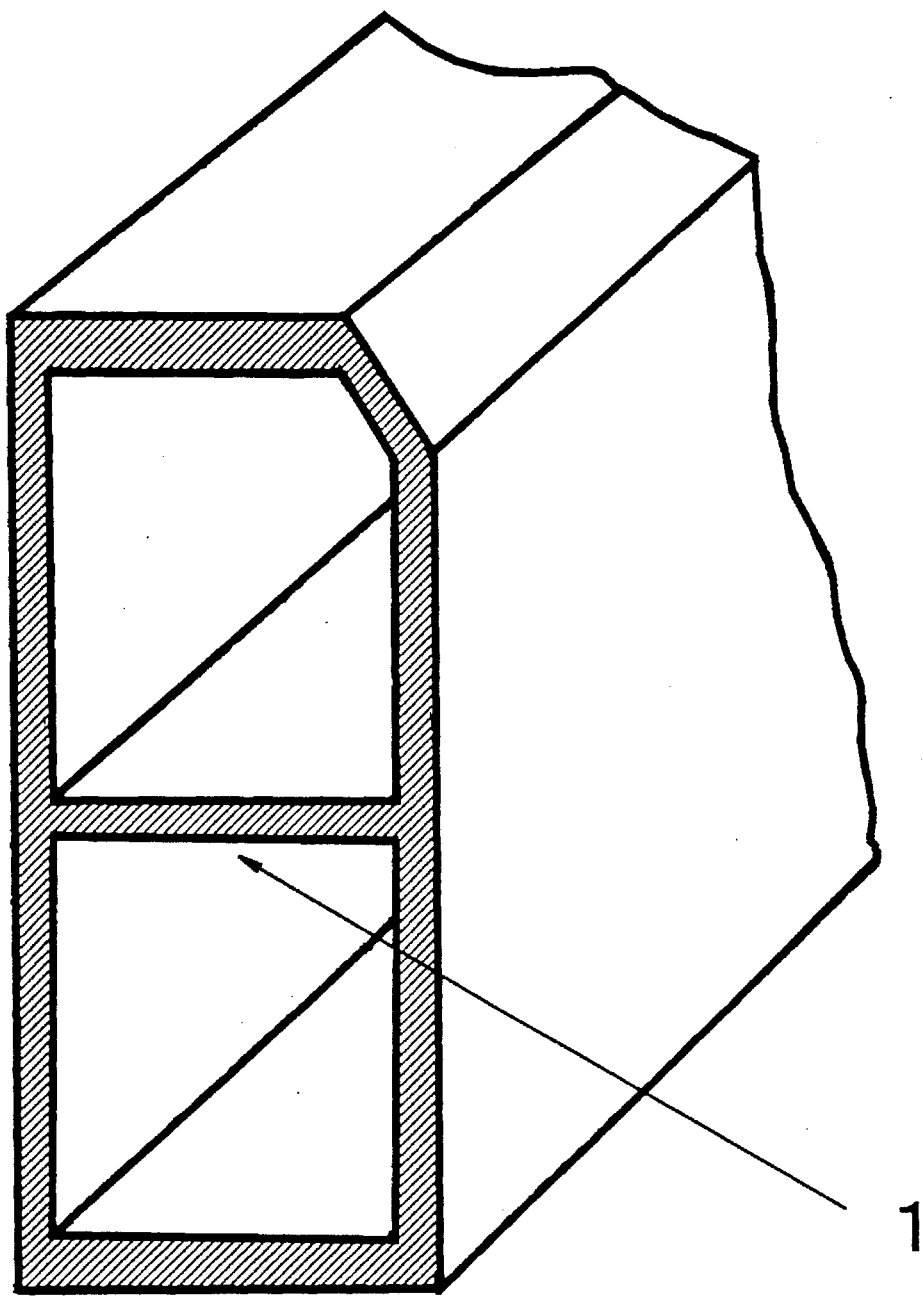
FIG. 1 is a perspective end view of the profile extrusion molded article described in the Examples below.

The present invention is described in more detail below.

The thermoplastic aromatic polycarbonate resin for use in the present invention having excellent heat resistance and impact resistance can be obtained by reacting an aromatic dihydroxy compound or an aromatic dihydroxy compound and a small amount of a polyhydroxy compound, with phosgene or diester carbonate using a conventional method, such as an interfacial polymerization method, a pyridine method and a solution polymerization method, etc. Furthermore, the aromatic polycarbonate resin may be branched.

Examples of the aromatic dihydroxy compound for use in the present invention include 2,2-bis(4-hydroxyphenyl)propane, 2,2-bis(4-hydroxy-3,5-dimethylphenyl)propane, 2,2-bis(4-hydroxy-3,5-dibromophenyl)propane, 1,1-bis(4-hydroxyphenyl)cyclohexane, bis(4-hydroxyphenyl)-p-diisopropylbenzene, hydroquinone and resorcinoland 4,4'-dihydroxydiphenyl can be used. Among these, bisphenol A is particularly preferred.

Examples of the branching agent which may be used to obtain a grafted aromatic polycarbonate resin include a polyhydroxy compound, such as chloroglycin, 4,6-dimethyl-2,4,6-tri(4-hydroxyphenyl)heptene-2, 4,6-dimethyl-2,4,6-tri(4-hydroxyphenyl)heptane-2, 2,6-dimethyl-2,4,6-tri(4-hydroxyphenyl)heptene-3, 1,3,5-tri(4-hydroxyphenyl)benzene, 1,1,1-tri(4-hydroxyphenyl)ethane; and 3,3-bis(4-hydroxyaryl)oxyindole, 5-chloroisatinbisphenol, 5,7-dichloroisatinbisphenol, 5-bromoisatinbisphenol, etc. A part, for example, from 0.1 to 2 mole %, of the aromatic dihydroxy compound may be replaced by one or more of these branching agents. Furthermore, a molecular weight modifier can be used, if necessary. The molecular weight modifier can be a monovalent aromatic hydroxy compound. Preferred aromatic hydroxy compounds include, for example, m- and p-methylphenol, m- and p-propylphenol, p-bromophenol, p-terbutyl phenol, and p-long chain alkyl substituted phenol.

Representative of the aromatic polycarbonate resin which is a constituent component of the resin composition of the present invention is a bis(4-hydroxyphenol)alkane compound, and particularly a polycarbonate derived bisphenol A. Other aromatic polycarbonate polymers include those obtained by reacting two or more kinds of aromatic dihydroxy compounds, and a grafted aromatic polycarbonate polymer obtained by adding a small amount of a trivalent phenol compound to the reaction mixture. Furthermore, two or more kinds of aromatic polycarbonate resins may be used in combination.

The graft co-polymer is obtained by copolymerizing ethylene-α-olefin-diene copolymer and a monomer mixture comprising as main components an aromatic vinyl compound and a vinyl cyanide compound. The ethylene-α-olefin-diene copolymer is a copolymer of ethylene and α-olefin as essential components and a diene compound. The weight ratio of ethylene to α-olefin is generally from 90:10 to 20:80, preferably from 75:25 to 40:60.

Propylene is a preferred α-olefin which constitutes the ethylene-α-olefin-diene copolymer, and dicyclopentadiene, ethylidenenorbornene, 1,4-pentadiene, 1,4-hexadiene, 1,5-cyclooctadiene may be used as the diene compound. Furthermore, the ratio of the unsaturated bond in the ethylene-α-olefin-diene copolymer is preferably in the range from 4 to 50 based on an iodine value.

The monomer component which constitutes the graft copolymer of the present invention contains an aromatic vinyl compound and vinyl cyanide as essential components. The monomer mixture may be further comprise other vinyl monomers capable of co-polymerizing with an aromatic vinyl compound and a vinyl cyanide compound. The aromatic vinyl compound enhances moldability at the time of molding, and the vinyl cyanide provides chemical resistance and paintability.

Useful aromatic vinyl compounds of the monomer mixture include, for example, styrene monomer, such as styrene, p-methylstyrene, α-methylstyrene, vinyl toluene and dimethyl styrene. Useful vinyl cyanide compounds of the monomer mixture include, for example, acrylonitrile and methacrylonitrile. Furthermore, other vinyl compounds capable of co-polymerizing with an aromatic vinyl compound and a vinyl cyanide compound preferably include methylmethacrylate and ethylmethacrylate.

The composition ratio of the monomer mixture is preferably from 50 to 85% by weight of the aromatic vinyl compound and from 50 to 15% by weight of the vinyl cyanide compound, and if present, from 0 to 30% by weight of other vinyl compounds capable of co-polymerizing with an aromatic vinyl compound and a vinyl cyanide compound.

The graft copolymerizing method for reacting the above-described monomer mixture in the presence of the ethylene-α-olefin-diene copolymer is not particularly limited. Useful method include an emulsion polymerization method, a solution polymerization method, a bulk polymerization method and a method comprising a combination of the methods.

The solution polymerization method preferred, therein, an organic solvent is used so that the rubber polymer component (ethylene-α-olefin-diene copolymer) is transformed to a particulate dispersion phase. Useful organic solvents for this type of solution polymerization include one or both of an aliphatic hydrocarbon and an aromatic hydrocarbon solvent. Toluene is preferred. The particle size of the dispersed rubber particles of the graft co-polymer of the present invention obtained by copolymerizing ethylene-α-olefin-diene copolymer and a monomer mixture comprising an aromatic vinyl compound and a vinyl cyanide compound as a main component is preferably in the range from 0.1 to 1 μm.

A preferred graft-copolymer for use in the present invention is AES resin which imparts excellent molding properties such as drawdown property and good weathering resistance. AES resin is a graft copolymer of an ethylene-propylene-diene copolymer with acrylonitrile and styrene.

The content of graft copolymer component (b) of the present invention is from 5 to 60% by weight of the resin composition, preferably from 10 to 30% by weight. When the compounding amount is less than 5% by weight, draw down of the resin occurs at the time of profile extrusion and weathering resistance of the product is reduced. When the compounding amount is more than 60% by weight, the heat resistance of the product disadvantageously decreases.

The desired effect of the present invention can not be achieved by independently using only one of the glass filler and the carbon fiber. Rather, in the present invention, the glass filler (c) and carbon fiber (d) are compounded as essential components and it is necessary to use these components concurrently.

Useful glass fillers include glass fiber, glass flake and glass bead. More particularly, useful glass filler include those having a mean diameter of from 2 to 30 μm, chopped strand fibers having a length of from 3 to 10 mm, milled fibers having a length of from 30 to 100 μm and roving strand fibers. The glass flake preferably has a mean thickness of from 0.1 to 50 μm and a mean maximum length of from 10 to 2000 μm. The glass fiber is preferably treated with a coupling agent or other finishing agent, and a glass fiber bundled by a polycarbonate resin is preferred.

The glass filler content is in the range from 5 to 30% by weight based on the total weight of the resin composition of the present invention. When the glass filler content is less than 5% by weight, the dimensional accuracy (dimensional stability, resistance to shrinking), strength and rigidity are decreased, and the reinforcement function is inadequate. On the other hand, when the glass filler content exceeds 30% by weight, the flowability decreases, it becomes difficult to carry out profile extrusion, and a large amount of cylinder abrasion in the molding machine is observed. The glass filler content is more preferably from 10 to 30% by weight.

Useful carbon fibers include the commercially available polyacrylonitrile (PAN) series, pitch series chopped strand, roving strand and milled fiber having a diameter in the range of from 1 to 30 μm. The carbon fiber is preferably treated with a coupling agent or other finishing agent. Furthermore, the carbon fiber is preferably bundled by a polycarbonate resin.

Addition of the carbon fiber to the resin composition improves the strength of the molded article, its rigidity, slip property to a sizing plate and appearance. In these respects, the carbon fiber content is preferably in the range of from 0.5 to 20% by weight, more preferably from 1 to 10% by weight of the resin composition. When the content is less than 0.5% by weight, the reinforcement strength and rigidity are not sufficient. When the carbon fiber content exceeds 20% by weight, the melting viscosity becomes large, and it is not easy to carry out the molding step. Furthermore, a bridge is formed at the inside of the die and stable profile extrusion can not be achieved.

Furthermore, a resin composition containing a relatively large amount of the glass filler forms a bridge at the inside of the die, and the resin tends to clog the die. Thus, not only the strength and rigidity but also the molding property can be improved by using a smaller glass fiber content than that which is conventionally added to a reinforced material.

The resin composition of the present invention comprises the above components (a), (b), (c) and (d) as essential components in the above-described amounts. Additives, such as an UV absorber, stabilizer, pigment, dye, lubricant, etc., or an organic reinforcement material may be added to the resin composition as needed. These additives may be included as long as the properties of the resin composition of the present invention are not adversely affected.

Conventional methods may be used to compound the resin composition of the present invention. For example, an extruder, a mixer such as a Banbury and a Henschel mixer, and a roller may be used.

The present invention is described in greater detail by reference to the following Examples, but the present invention should not be construed as being limited thereto.

EXAMPLES

Example 1-5 and Comparative Example 1-5

Aromatic polycarbonate resin derived from Bisphenol A (Mitsubishi Gas Chemical Co., Inc., IUPILON E-2000, molecular weight of 28,000) as component (a), AES resin (b1) (Japan Synthetic Rubber Co., Ltd. AES145, a graft copolymer of an ethylene-propylene-diene copolymer with acrylonitrile and styrene) as component (b), a chopped strand glass fiber (Nippon Electric Glass Co., Ltd. ECS03T531DE, fiber diameter of 6 μm) as component (c) and carbon fiber (Toho Rayon Co., Ltd., HTA-C6-CI) as component (d) were used and mixed in a tumbler in the amounts (weight %) indicated in Table 1. However, Comparative Example 1 contained only component (a) and carbon black, Comparative Example 2 did not contain component (d), Comparative Example 4 did not contain component (a) and commercially available ABS resin (b2) (Mitsubishi Rayon Co., Ltd., SE-3) was used in place of the AES resin as component (b) in the Comparative Example 5.

The thus obtained pellet was dried at 120° C. for over 5 hours in a hot-air drier, and then profile extruded at 260° C. to obtain a hollow molded article having the shape indicated in FIG. 1. In FIG. 1 the molded article includes center rib 1. Test pieces for physical testing were cut from the molded article and tested as described below.

The physical properties were determined according to the following methods:

specific gravity: ASTM D-792 flexural strength or flexural modulus: ASTM D-790

Charpy impact strength (Notch: 0.25 mmR): JIS K-7111 deflection temperature under load (load; 18.6 kg/cm$^2$): ASTM D-468 resistance to weathering (exposure test): A color difference ΔE was determined using a sunshine weather test machine manufactured by Suga Test Machine Co., Ltd., at a black panel temperature of 63° C., and a rain spray of 18 minutes/120 minutes for 1000 hours.

The drawdown at the time of the profile extrusion was evaluated by the extent of deformation of center rib 1 of the molded article as indicated in Table 1.

TABLE 1

| | | Example | | | | | | |
|---|---|---|---|---|---|---|---|---|
| | | 1 | 2 | 3 | 4 | 5 | 6 | 7 |
| composition | component(a) | 69 | 61 | 61 | 55 | 45 | 65 | 55 |
| | component(b1) | 10 | 10 | 10 | 20 | 30 | 20 | 10 |
| | component(b2) | | | | | | | |
| | component(c) | 20 | 20 | 20 | 20 | 20 | 10 | 30 |
| | component(d) | 1 | 5 | 10 | 5 | 5 | 5 | 5 |
| | carbon black | | | | | | | |
| Specific gravity (Article molded by Profile Extrusion) | | 1.28 | 1.30 | 1.31 | 1.28 | 1.26 | 1.22 | 1.38 |
| Flexural Strength (kg/cm$^3$) | | 1623 | 1712 | 1874 | 1798 | 1795 | 1538 | 1861 |
| Flexural Modulus (×10$^3$) (kg/cm$^2$) | | 61.9 | 78.6 | 98.3 | 80.7 | 82.7 | 63.5 | 83.6 |
| Charpy Impact Strength (kJ/m$^2$) | | 30 | 43 | 47 | 45 | 45 | 46 | 41 |
| Deflection Temperature under Load (°C.) | | 130 | 131 | 133 | 125 | 120 | 123 | 134 |
| Resistance to Weathering ΔE | | 1.6 | 1.5 | 0.9 | 1.4 | 1.1 | 1.7 | 1.4 |
| Processability | Drawdown | 0 | 0 | 0 | 0 | 0 | 0 | ● |
| | Throughput rate | 562 | 570 | 565 | 546 | 533 | 525 | 576 |

| | | Comparative Example | | | | |
|---|---|---|---|---|---|---|
| | | 1 | 2 | 3 | 4 | 5 |
| composition | component(a) | 99.9 | 80 | 45 | — | 55 |
| | component(b1) | — | 10 | 10 | 74.9 | — |
| | component(b2) | | | | | 20 |
| | component(c) | — | 10 | 40 | 20 | 20 |
| | component(d) | — | — | 5 | 5 | 5 |
| | carbon black | 0.1 | | | 0.1 | |
| Specific gravity (Article molded by Profile Extrusion) | | 1.19 | 1.24 | 1.41 | 1.19 | 1.27 |
| Flexural Strength (kg/cm$^3$) | | 870 | 1260 | 2101 | 1706 | 1786 |
| Flexural Modulus (×10$^3$) (kg/cm$^2$) | | 23.7 | 38.0 | 122.7 | 86.7 | 79.7 |
| Charpy Impact Strength (kJ/m$^2$) | | 67 | 23 | 19 | 43 | 36 |
| Deflection Temperature under Load (°C.) | | 133 | 128 | 134 | 96 | 123 |
| Resistance to Weathering ΔE | | 3.8 | 2.9 | 1.6 | 0.7 | 3.2 |
| Processability | Drawdown | X | ● | Δ | 0 | ● |
| | Throughput rate | 553 | 521 | 438 | 582 | 556 |

*All amounts are given in weight % of the final resin composition.
Drawdown:
0 No deformation by drawdown.
● The deformation drawdown was 2 mm or less.
Δ The deformation by drawdown was from more than 2 mm to 5 mm.
X The deformation by drawdown exceeded 5 mm.

While the invention has been described in detail and with reference to specific embodiments thereof, it will be apparent to one skilled in the art that various changes and modifications can be made therein without departing from the spirit and scope thereof.

What is claimed is:

1. A resin composition for profile extrusion comprising (a) from 10 to 90% by weight of a thermoplastic aromatic polycarbonate resin, (b) from 5 to 60% by weight of a graft copolymer obtained by copolymerizing an ethylene-α-olefin-diene copolymer and a monomer mixture comprising as main components an aromatic vinyl compound and a vinyl cyanide compound, (c) from 5 to 30% by weight of a glass filler and (d) from 0.5 to 30% by weight of carbon fiber.

2. The resin composition of claim 1 wherein weight ratio of ethylene to α-olefin of the ethylene-α-olefin-diene copolymer is from 90:10 to 20:80.

3. The resin composition of claim 2 wherein the ethylene-α-olefin-diene copolymer is ethylene-propylene-diene copolymer.

4. The resin composition of claim 1 wherein the monomer mixture comprises from 50 to 85% by weight of an aromatic vinyl compound and from 50 to 15% by weight of a vinyl cyanide compound and from 0 to 30% by weight of vinyl compound.

5. The resin composition of claim 1 wherein the monomer mixture further comprises up to 30% by weight of a vinyl compound other than said aromatic vinyl compound and said vinyl cyanide compound.

6. The resin composition according to claim 1 wherein the monomer mixture in the graft copolymer (b) comprises from 50 to 85% by weight of aromatic vinyl compound and from 50 to 15% by weight of vinyl cyanide compound.

7. The resin composition of claim 4 wherein the aromatic vinyl compound is styrene and the vinyl cyanide compound is acrylonitrile.

8. The resin composition of claim 1 wherein the graft copolymer is AES resin.

9. The resin composition of claim 1 wherein the glass filler is selected from the group consisting of glass fiber, glass flake and glass bead.

10. A resin composition for profile extrusion comprising (a) from 45 to 70% by weight of a thermoplastic aromatic polycarbonate resin, (b) from 10 to 30% by weight of a graft copolymer obtained by copolymerizing ethylene-α-olefin-diene copolymer and a monomer mixture comprising as main components an aromatic vinyl compound and a vinyl cyanide compound, (c) from 10 to 30% by weight of a glass filler and (d) from 1 to 10% by weight of carbon fiber.

11. A resin composition for profile extrusion comprising (a) from 45 to 70% by weight of a thermoplastic aromatic polycarbonate resin, (b) from 10 to 30% by weight of a graft copolymer of an ethylene-propylene-diene copolymer with acrylonitrile and styrene, (c) from 10 to 30% by weight of a glass fiber and (d) from 1 to 10% by weight of carbon fiber.

* * * * *